United States Patent
Kienzle et al.

(10) Patent No.: US 11,557,841 B2
(45) Date of Patent: Jan. 17, 2023

(54) METALLIZED DIELECTRIC WAVEGUIDE

(71) Applicant: VEGA Grieshaber KG, Wolfach (DE)

(72) Inventors: Klaus Kienzle, Zell am Harmersbach (DE); Steffen Waelde, Niedereschach (DE)

(73) Assignee: VEGA GRIESHABER KG, Wolfach (DE)

( * ) Notice: Subject to any disclaimer, the term of this patent is extended or adjusted under 35 U.S.C. 154(b) by 314 days.

(21) Appl. No.: 16/738,608

(22) Filed: Jan. 9, 2020

(65) Prior Publication Data

US 2020/0243980 A1 Jul. 30, 2020

(51) Int. Cl.
- *H01Q 13/28* (2006.01)
- *H01P 3/16* (2006.01)
- *G01S 13/88* (2006.01)

(52) U.S. Cl.
CPC .......... H01Q 13/28 (2013.01); G01S 13/88 (2013.01); H01P 3/16 (2013.01)

(58) Field of Classification Search
CPC ........... H01Q 13/28; G01S 13/88; H01P 3/16; H01P 3/165; H01P 3/18
See application file for complete search history.

(56) References Cited

U.S. PATENT DOCUMENTS

| | | | |
|---|---|---|---|
| 6,661,389 B2* | 12/2003 | Griessbaum | H01Q 13/02 343/873 |
| 8,390,402 B2 | 3/2013 | Kunes | |
| 9,273,989 B2* | 3/2016 | Sai | H01Q 13/06 |
| 9,472,840 B2* | 10/2016 | Herbsommer | H01P 3/16 |
| 9,601,820 B2* | 3/2017 | Herbsommer | H01P 3/122 |
| 9,705,174 B2* | 7/2017 | Payne | H01P 3/16 |
| 2012/0153969 A1 | 6/2012 | Eckert et al. | |
| 2014/0285277 A1 | 9/2014 | Herbsommer et al. | |
| 2018/0097268 A1 | 4/2018 | Oster et al. | |

FOREIGN PATENT DOCUMENTS

| | | |
|---|---|---|
| CA | 2449596 | 6/2005 |
| CN | 1910785 | 2/2007 |
| DE | 102010063167 | 6/2012 |
| DE | 102014118867 | 4/2016 |
| EP | 1863122 | 12/2007 |
| EP | 2 631 611 A1 | 8/2013 |
| JP | H08105784 | 4/1996 |

OTHER PUBLICATIONS

Filonov et al., "Metalized Polymer Tubes for High-Frequency Electromagnetic Waveguiding", School of Electrical Engineering, Tel Aviv University, Nov. 2018, 5 sheets.

Baer et al., "Dielectric Waveguides for Industrial Rada Applications", Journal of Microwave and Wireless Technologies, Feb. 2015, 16 sheets.

* cited by examiner

*Primary Examiner* — Tho G Phan
(74) *Attorney, Agent, or Firm* — Fay Kaplun & Marcin, LLP

(57) ABSTRACT

Described are a dielectric conductor arrangement, a method for producing the conductor arrangement, a level radar and a use of the conductor arrangement. The conductor arrangement has a dielectric conductor core made of a solid. Furthermore, the conductor arrangement has a coating 30 which, at least in sections, surrounds the entire circumference of the conductor core without a gap and which consists of a thin conductive layer.

18 Claims, 3 Drawing Sheets

METALLIZED DIELECTRIC WAVEGUIDE

PRIORITY CLAIM

This application claims priority to EP Patent Application Serial No. 19 153 596.2 filed on Jan. 24, 2019; the entire content of which is incorporated herein by reference.

FIELD

The disclosure relates to a dielectric conductor arrangement, a method for producing a dielectric conductor arrangement, a level radar and a use.

BACKGROUND

For level measurement or limit level determination, for example in a container, a level radar is used, for example, to measure a certain level of a product, e.g. in the container. For this purpose, radar waves are used which are generated in a radio-frequency unit and radiated by an antenna unit. However, as the frequency increases, it becomes increasingly difficult to transmit the radar waves by means of a coaxial cable. Therefore, the radar waves and/or microwaves of higher frequencies are transferred in many cases by means of rigid metallic waveguides, filled with a gas, for example air. However, the lack of mechanical flexibility of these waveguides may limit the design and/or construction of level radars.

SUMMARY

A first aspect of the disclosure relates to a dielectric conductor arrangement for transmitting microwaves. The dielectric conductor arrangement has a dielectric conductor core made of a solid. Furthermore, the dielectric conductor arrangement has a coating which, at least in sections, surrounds the entire circumference of the conductor core without gaps and which consists of a thin conductive layer.

Thus, a radar wave transmission waveguide assembly is provided which has mechanical flexibility.

The microwaves comprise at least one frequency range of the radar waves. The micro-waves comprise a frequency range of 1 to 300 GHz, for example greater than 60 GHz, e.g. over 200 GHz. A dielectric conductor core has a dielectric constant Cr of greater than 1.5, in particular greater than 3. The dielectric core is a solid. The solid is chosen so that there is only a small attenuation of the microwaves. The solid may, for example, comprise a plastic, glass fiber or ceramic or consist of a plastic, glass fiber or ceramic. The solid is designed to be flexible. In this case, the solid can be set up to have a bending radius of less than 20 cm, in particular less than 4 cm. The solid may be designed to be approved for a temperature range up to 250° C. Some solids, such as ceramic fiber, may be approved up to 450° C.

The coating of the dielectric conductor arrangement consists of a thin conductive layer. This layer surrounds the entire circumference of the conductor core gap-free, at least in sections. The thin conductive layer further contributes to an improvement in wave propagation in the dielectric conductor arrangement. In addition, the conductive layer leads to an improvement of immunity to interference. As a result, on the one hand the immissions of sources of interference are reduced in the conductor core, and on the other hand, the radiation of the microwaves from the core is significantly reduced.

In this case, for example, connection points of the dielectric conductor arrangement can have no or no complete conductive layer. The connection points can, e.g. be arranged at a joint, in which two line sections are joined together. Connection points may, e.g. also be arranged at the beginning and/or at the end of the conductor arrangement, where the microwaves are, for example, coupled and/or decoupled. For the coupling and/or decoupling of the microwaves, it is possible, for example, to use techniques which are known in the prior art.

The combination of the mentioned features may significantly improve and/or simplify the transmission of microwaves and the handling of a ladder arrangement for the transmission of microwaves. In particular, this makes it possible to simplify the production of measuring instruments for level measurement or limit level determination, for example a fill level radar. In particular, by the flexibility of the conductor arrangement, their handling can be simplified. This can contribute to a reduction in the cost of manufacturing and/or maintaining the conductor assembly or devices that comprise this conductor assembly. Due to the flexibility of the conductor arrangement can also be designed bendable and to a degree even wound up.

In one embodiment, the conductor arrangement is configured to have a bending radius of less than 20 cm, in particular less than 4 cm. This further increases the flexibility of the conductor arrangement.

In one embodiment, the dielectric conductor core is substantially cylindrical. This design can further contribute to a low attenuation of the microwaves.

In a further embodiment, the dielectric conductor core can be elliptical or right-angled.

In one embodiment, the dielectric conductor core comprises polytetrafluoroethylene, PTFE, polyetheretherketone, PEEK, polypropylene, PP, polyethylene, PE, ceramic and/or a temperature-resistant glass fiber, or the conductor core consists of at least one of these materials. These materials can advantageously combine good availability of the materials and good transfer properties. In addition, at least some of these materials may be more cost effective than, e.g. rigid metallic waveguide.

In one embodiment, the coating has a conductivity of greater than $30 \cdot 10^6$ S/m, for example, greater than $50 \cdot 10^6$ S/m. Such high conductivity may contribute to further reduction of immissions originating from sources of interference in the conductor core. On the other hand, this can significantly reduce the radiation of the microwaves from the conductor core.

In one embodiment, the coating comprises metal, in particular copper, silver, gold, palladium, alloys of these metals, conductive substances, in particular metallized plastics, graphene, a ductile conductive material and/or a combination of the materials mentioned. The choice of materials for the coating can be determined by material properties such as brittleness, applicability and/or cost.

In one embodiment, the coating has a thickness between 20 μm and 200 μm, in particular between 50 μm and 100 μm. This has proven to be a good compromise between good shielding, ease of handling and good cost structure.

In one embodiment, the coating comprises conductive lacquer, for example silver-conducting lacquer. In this case, the conductive lacquer is applied by brushing, spraying, dipping and/or other methods. This has proven to be advantageous in experiments for the purposes mentioned above. An advantage of this method is that the area between waveguide and metallization is always gap-free due to the production. As a result, the microwaves are optimally guided in the waveguide.

In one embodiment, the coating is applied to the dielectric core by means of a thin-film technique.

In one embodiment, the coating is applied to the dielectric conductor core by means of physical vapor deposition, in particular by sputter deposition or thermal evaporation, by means of chemical vapor deposition, in particular by plasma enhanced chemical vapor deposition, by thermal spraying, and/or by electroplating, in particular by plastic electroplating. The said methods advantageously combine a precise coating with good handling. An advantage of the methods mentioned is that the region between the waveguide and the metallization is always gap-free as a result of the production. As a result, the microwaves are optimally guided in the waveguide.

In one embodiment, the dielectric waveguide may first be shaped and subsequently coated and/or metallized. This may be advantageous, for example, if a waveguide is to be wound up relatively tightly, for example spirally.

In one embodiment, the diameter of the dielectric conductor core is selected so that only the fundamental mode of the microwaves is capable of propagation in a predefined frequency range. In this case, the predefined frequency range can be dependent on further specifications of the system in which the conductor arrangement is installed. The basic mode of the microwaves is also called $TE_{11}$ mode or $H_{11}$ mode in the round waveguide. In the rectangular waveguide, the fundamental mode has the designation $TE_{10}$ or $H_{10}$. This embodiment may result in lower signal falsifications, e.g. caused by (disturbing) dispersion of the signal. This embodiment can be advantageously used in particular for signal transmission over further distances.

In one embodiment, the coating is further coated and/or enclosed with a material for shock absorption. This may be particularly advantageous when the conductor assembly is used outside a protective housing.

Another aspect of the disclosure relates to a level radar. The level radar has a radio-frequency unit which is set up to generate a microwave signal. In addition, it has an antenna unit which is set up for emitting the microwave signal. Furthermore, the level radar has a dielectric conductor arrangement as described above and/or described below, which is set up for transmitting the microwave signal generated by the high-frequency unit to the antenna unit.

In this case, the dielectric conductor arrangement can be used, for example, for bridging a distance between the radio-frequency unit and the antenna unit. This may be advantageous, for example, to achieve a predefined transit time between the two units or, for example, for temperature decoupling of the two units.

In one embodiment, the dielectric conductor arrangement is designed in several parts. In this case, the connection of the sections of the dielectric conductor arrangement can, for example, be cut exactly flat or cut at exactly the same angle and be surrounded by a metallic or metallized sleeve. In this case, the inside diameter of the sleeve can be exactly matched to the outside diameter of the metallized waveguide. This can result in a gap-free microwave connection, which is held in place by the fit of the parts themselves. The compound can be made detachable or insoluble.

In one embodiment, the dielectric conductor arrangement is arranged spirally at least in sections. This is possible because of the flexibility of the conductor arrangement. This can contribute to a reduction in the cost of manufacturing and/or maintaining the conductor assembly or devices that comprise this conductor assembly.

A further aspect of the disclosure relates to a method for producing a dielectric conductor arrangement as described above and/or below. The method comprises the following steps:

Providing a dielectric conductor core;

Applying, at least in sections, a coating which surrounds the entire circumference of the conductor core gap-free and consists of a thin conductive layer.

In this case, the dielectric core can be brought into shape before and/or after the application of the coating. The application before the application of the coating can be advantageous, for example, if relatively narrow, for example helical, winding is to take place in waveguides.

In one embodiment, the conductor arrangement is designed in several parts. In this case, the method for producing a multipart dielectric conductor arrangement has the following further steps:

cutting one end of a first dielectric conductor core and one end of a second dielectric conductor core at a predefined angle, wherein the end of the first dielectric conductor core and the end of the second dielectric conductor core have the same angle;

joining the end of the first dielectric core and the end of the second dielectric core in a Z-angle;

shrouding the end portion of the first dielectric core and the end portion of the second dielectric core by means of a metallic or metallized sleeve.

The predefined angle can be 90° or an acute angle, in particular an angle between 30° and 60°, for example between 40° and 50°. The ends of the first and second dielectric conductor cores are cut exactly flat if possible. The ends are then joined together until contact or stop. This can be done before and/or after encasing the end areas by means of the metallic or metallized sleeve. In this way, an essentially gap-free microwave connection can be created, which holds itself due to the fit of the parts. In addition, the connection can also be form-fitting, force-fitting and/or materially connected, e.g. glued or and/or fixed with a shrink tube or otherwise.

In one embodiment, the connection between the first dielectric conductor core and the second dielectric conductor core is designed to be detachable. This simplifies the reconfiguration of the conductor arrangement, for example in the case of repair and/or maintenance.

Another aspect of the disclosure relates to the use of a dielectric conductor arrangement as described above and/or below for the transmission of microwaves in a frequency range from approximately 80 GHz to approximately 300 GHz, in particular approximately 240 GHz.

For further clarification, further aspects will be described with reference to embodiments shown in the figures. These embodiments are to be understood as an example only, not as a limitation.

DETAILED DESCRIPTION

Figure 1:
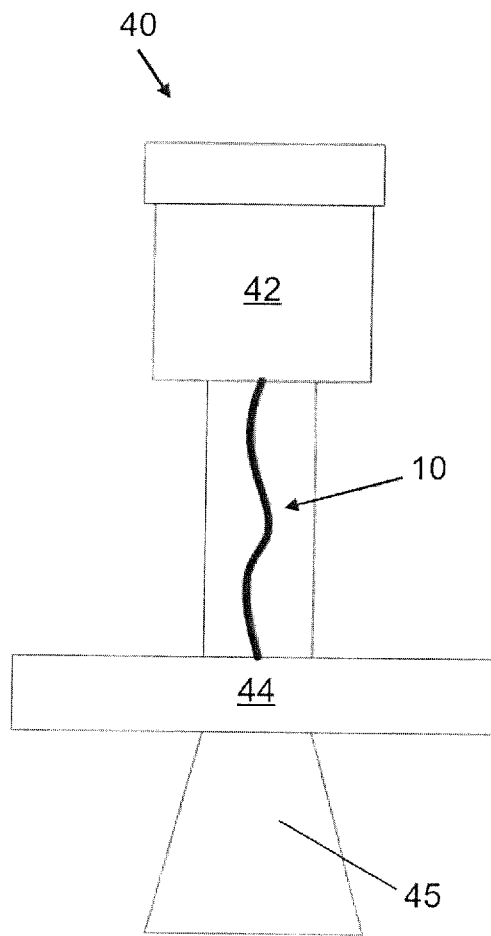
FIG. 1 shows a schematic sketch of a level measuring device according to an embodiment.

FIG. 1 shows a schematic sketch of a fill level measuring device or fill level radar 40 according to one embodiment. In this case, the fill level radar 40 has a high-frequency unit 42, which is set up to generate a microwave signal. In addition, it has an antenna unit 44, which is set up for emitting the microwave signal. The antenna unit 44 can be arranged for example by means of a flange to the container with the contents to be measured. The high-frequency unit 42 and the antenna unit 44 are connected by means of a dielectric conductor arrangement 10, which is set up for transmitting the microwave signal generated by the high-frequency unit 42 to the antenna unit 44. The radiating of the microwave signal takes place, for example, by means of the antenna unit 44, to which an antenna horn 45 can be attached for better focusing. In the area of the antenna unit 44, there are high temperatures, e.g. up to 250° C., or even up to 450° C. Therefore, the conductor arrangement 10 can contribute to the thermal decoupling of the antenna unit 44 and the high frequency unit 42. Furthermore, the conductor arrangement 10 is designed temperature-resistant against these high temperatures.

Figure 2:
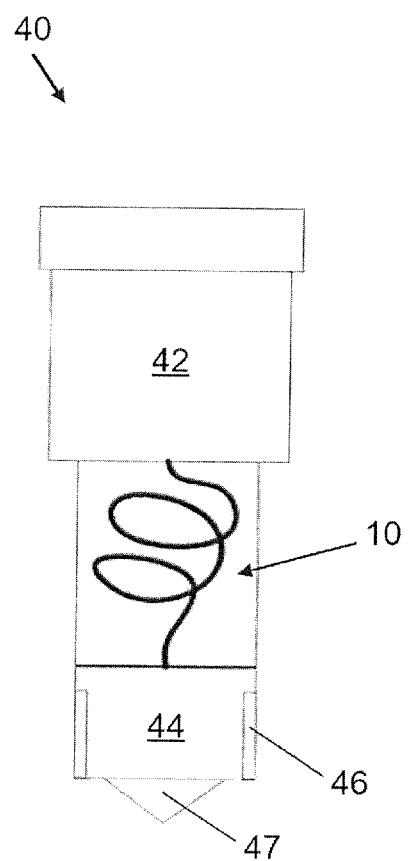
FIG. 2 shows a schematic sketch of a fill level measuring device according to a further embodiment.

FIG. 2 shows a schematic sketch of a fill level measuring device 40 according to a further embodiment. In this case, the fill level radar 40 has a high-frequency unit 42, which is set up to generate a microwave signal. In addition, it has an antenna unit 44, which is set up for emitting the microwave signal. The antenna unit 44 may have a screw thread 46 in this embodiment. The high-frequency unit 42 and the antenna unit 44 are connected by means of a dielectric conductor arrangement 10, which is set up to transmit the microwave signal generated by the radio-frequency unit 42 to the antenna unit 44. The conductor arrangement 10 is designed to be spiral-shaped, for example in order to achieve a predefined transit time between the high-frequency unit 42 and the antenna unit 44 or, for example, for temperature decoupling. This embodiment is possible in particular by the flexibility of the conductor arrangement 10.

Figure 3A:
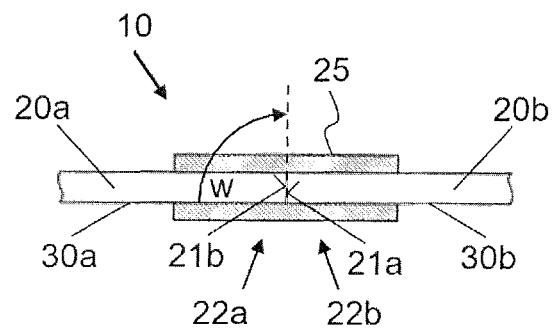
FIG. 3a shows a schematic sketch of a connection of two conductor arrangements according to an embodiment.

FIG. 3a shows a schematic sketch of a connection of two conductor arrangements 10 according to an embodiment. In this case, one end 21a of a first dielectric conductor core 20a and one end 21b of a second dielectric conductor core 20b are cut off at a predefined angle w. In this case, the end 21a of the first dielectric conductor core 20a and the end 21b of the second dielectric conductor core 20b have the same angle w, in the embodiment shown 90°. End portions 22a and 22b of the conductor cores 20a and 20b are covered with a metallic or metallized sleeve 25. The end regions 22a and 22b may have, at least in sections, a coating 30a and 30b. The sleeve 25 can be form-fitting, force-fitting and/or materially connected to at least one of the conductor cores 20a and 20b or to the coating 30a and 30b, e.g. glued or and/or with a heat shrink tubing or otherwise fixed. The compound can be made detachable or insoluble.

Figure 3B:
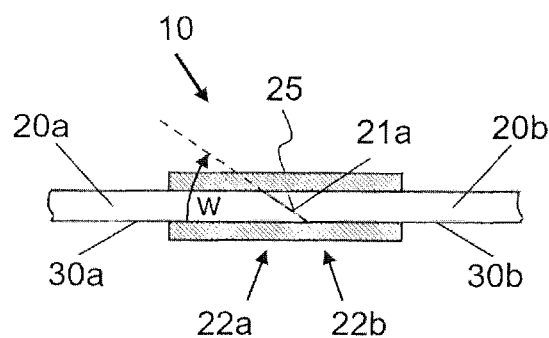
FIG. 3b shows a schematic sketch of a connection of two conductor arrangements according to a further embodiment.

FIG. 3b shows a schematic sketch of a connection of two conductor arrangements 10 according to a further embodiment. FIG. 3b differs from FIG. 3a by the angle w, which is an acute angle in FIG. 3b. The conductor cores 20a and 20b have the same angle w.

Figure 4:
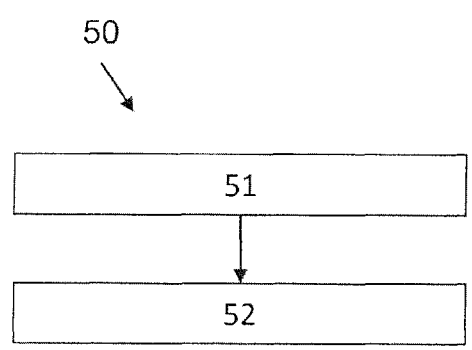
FIG. 4 shows a method according to an embodiment.

FIG. 4 shows a flowchart 50 of a method according to one embodiment. In a step 51, a dielectric conductor core 20 (see figures above) is provided as specified in the above description. In a step 52, at least in sections, a coating 30 is applied. The coating 30 surrounds the entire circumference of the conductor core 20 gap-free and consists of a thin conductive layer. In this case, the dielectric core can be shaped before and/or after the coating is applied, e.g. into a spiral shape.

In addition, it should be noted that "comprising" and "having" does not exclude other elements or steps, and the indefinite articles "a" or "an" exclude no plurality. It should also be appreciated that features or steps described with reference to any of the above embodiments may also be used in combination with other features or steps of other embodiments described above. Reference signs in the claims are not to be considered as limitations.

LIST OF REFERENCE NUMBERS 10 dielectric conductor arrangement
20, 20a, 20b dielectric core
21a, 21b end
22a, 22b end area
25 sleeve
30, 30a, 30b coating
40 level measuring device, level radar
42 high-frequency unit
44 antenna system
45 antenna horn
46 thread
47 conical area
50 flowchart
51, 52 steps

The invention claimed is:

1. A dielectric conductor arrangement for transmitting microwaves, comprising:
    a solid elongated dielectric conductor core of a substantially uniform diameter made of a solid material, the conductor core being flexible and the substantially uniform diameter being selected such that in a predefined frequency range only a fundamental mode of the microwaves is propagable; and
    a coating surrounding an entire circumference of the conductor core in sections and without gaps between the sections, the coating being a thin conductive layer having a thickness between 20 µm and 200 µm,
    wherein the coating is applied to the dielectric conductor core by means of at least one of physical vapor deposition, chemical vapor deposition, and electroplating, and
    wherein the arrangement is configured to be flexible and have a bending radius less than 20 cm.

2. The conductor arrangement according to claim 1, wherein the conductor arrangement is adapted to have a bending radius of less than 4 cm.

3. The conductor arrangement according to claim 1, wherein the conductor core comprises polytetrafluoroethylene, PTFE, polyetheretherketone, PEEK, polypropylene, PP, polyethylene, PE, ceramic and/or a temperature-resistant glass fiber or consists of at least one of these materials.

4. The conductor arrangement according to claim 1, wherein the coating has a conductivity of greater than $30 \cdot 10^6$ S/m.

5. The conductor arrangement according to claim 4, wherein the coating comprises metal.

6. The conductor arrangement according to claim 4, wherein the coating comprises copper, silver, gold, palladium, alloys of these metals, conductive substances, metallized plastics, graphene, a ductile conductive material and/or a combination of said materials.

7. The conductor arrangement according to claim 4, wherein the coating has a thickness of between 50 μm and 100 μm.

8. The conductor arrangement according to claim 1, wherein the coating has a conductivity of greater than $50 \cdot 10^6$ S/m.

9. The conductor arrangement according to claim 1, wherein the coating is further coated and/or enclosed with a material for shock absorption.

10. A level radar, comprising:
    a radio frequency unit configured to generate a microwave signal;
    an antenna unit adapted to radiate the microwave signal; and
    a dielectric conductor arrangement according to claim 1,
    wherein the conductor arrangement is arranged to transmit the microwave signal generated by the radio frequency unit to the antenna unit.

11. The level radar according to claim 10, wherein the conductor arrangement is designed in several parts.

12. The level radar according to claim 10, wherein the conductor arrangement is arranged spirally at least in sections.

13. Use of a dielectric conductor arrangement according to claim 1 for a transmission of microwaves in a frequency range of about 80 GHz to about 300 GHz.

14. Use of a dielectric conductor arrangement according to claim 1 for a transmission of microwaves in a frequency range of about 240 GHz.

15. The conductor arrangement according to claim 1, wherein the conductor arrangement is designed in several parts and wherein a connection of the parts is surrounded by a metallic or metallized sleeve.

16. A method for producing a dielectric conductor arrangement, comprising:
    providing a solid elongated dielectric conductor core of a substantially uniform diameter made of a solid material, the conductor core being flexible and the substantially uniform diameter being selected such that in a predefined frequency range only a fundamental mode of the microwaves is propagable; and
    applying by means of at least one of physical vapor deposition, chemical vapor deposition, and electroplating, at least in sections, a coating having a thin conductive layer being between 20 μm and 200 μm thick,
    wherein the sections are applied without gaps therebetween along an entire circumference of the conductor core, and
    wherein the arrangement is configured to be flexible and have a bending radius less than 20 cm.

17. A method for producing a multi-part dielectric conductor arrangement, comprising:
    providing a dielectric conductor core;
    applying, at least in sections, a coating which surrounds an entire circumference of the conductor core gap-free and consists of a thin conductive layer; and
    cutting one end of a first dielectric conductor core and one end of a second dielectric conductor core at a predefined angle, wherein the end of the first dielectric conductor core and the end of the second dielectric conductor core have the same angle w;
    joining the end of the first dielectric conductor core and the end of the second dielectric conductor core at a Z-angle w; and
    encasing the end portion of the first dielectric conductor core and the end portion of the second dielectric conductor core using a metallic or metallized sleeve.

18. The method according to claim 17, wherein the connection between the first dielectric conductor core and the second dielectric conductor core is made detachable.

* * * * *